US012330826B2

(12) United States Patent
Monti

(10) Patent No.: US 12,330,826 B2
(45) Date of Patent: Jun. 17, 2025

(54) PUSHING APPARATUS FOR PUSHING AND TRANSFERRING

(71) Applicant: Marchesini Group S.P.A., Pianoro (IT)

(72) Inventor: Giuseppe Monti, Pianoro (IT)

(73) Assignee: Marchesini Group S.P.A. (IT)

( * ) Notice: Subject to any disclaimer, the term of this patent is extended or adjusted under 35 U.S.C. 154(b) by 9 days.

(21) Appl. No.: 18/565,352

(22) PCT Filed: Jun. 21, 2022

(86) PCT No.: PCT/IB2022/055734
§ 371 (c)(1),
(2) Date: Nov. 29, 2023

(87) PCT Pub. No.: WO2022/269480
PCT Pub. Date: Dec. 29, 2022

(65) Prior Publication Data
US 2024/0253836 A1    Aug. 1, 2024

(30) Foreign Application Priority Data

Jun. 24, 2021 (IT) .................. 102021000016544

(51) Int. Cl.
*B65B 35/20* (2006.01)
*B65B 35/40* (2006.01)
*B65G 54/02* (2006.01)

(52) U.S. Cl.
CPC .......... *B65B 35/205* (2013.01); *B65B 35/405* (2013.01); *B65G 54/02* (2013.01)

(58) Field of Classification Search
CPC ....... B65B 35/205; B65B 35/405; B65B 5/04; B65B 25/14; B65G 54/02

USPC ................................................... 53/252, 569
See application file for complete search history.

(56) References Cited

U.S. PATENT DOCUMENTS

| 6,289,658 B1* | 9/2001 | Sting ................... B43M 3/045 53/284.3 |
| 9,403,611 B2 | 8/2016 | Sacchetti et al. |
| 2013/0186042 A1 | 7/2013 | Monti |

FOREIGN PATENT DOCUMENTS

| DE | 9310969 U1 | 11/1994 |
| EP | 0995684 A2 | 10/2005 |
| WO | 2013156177 A1 | 10/2013 |

* cited by examiner

*Primary Examiner* — Robert F Long
*Assistant Examiner* — Xavier A Madison
(74) *Attorney, Agent, or Firm* — Endurance Law Group PLC

(57) ABSTRACT

A pushing apparatus (100) for pushing and transferring products, comprising: a pusher element (A), conformed so as to abut a side of a product (P), or a group (P) of products, arranged on a conveyor (C) and which is to be pushed and transferred along a transfer direction (Z) transversal to the conveyor (C); a counter-pusher element (B), conformed and dimensioned so as to be positionable above and facing the product (P), or the group (P) of products, arranged on the conveyor (C) and follow the product (P), or the group of products, during at least a part of the transfer thereof along the transfer direction (Z) that is transversal to the conveyor (C) by means of the pusher element (A). The pushing apparatus (100) comprises a linear driving unit (U) for movement of the pusher element (A) and the counter-pusher element (B).

8 Claims, 12 Drawing Sheets

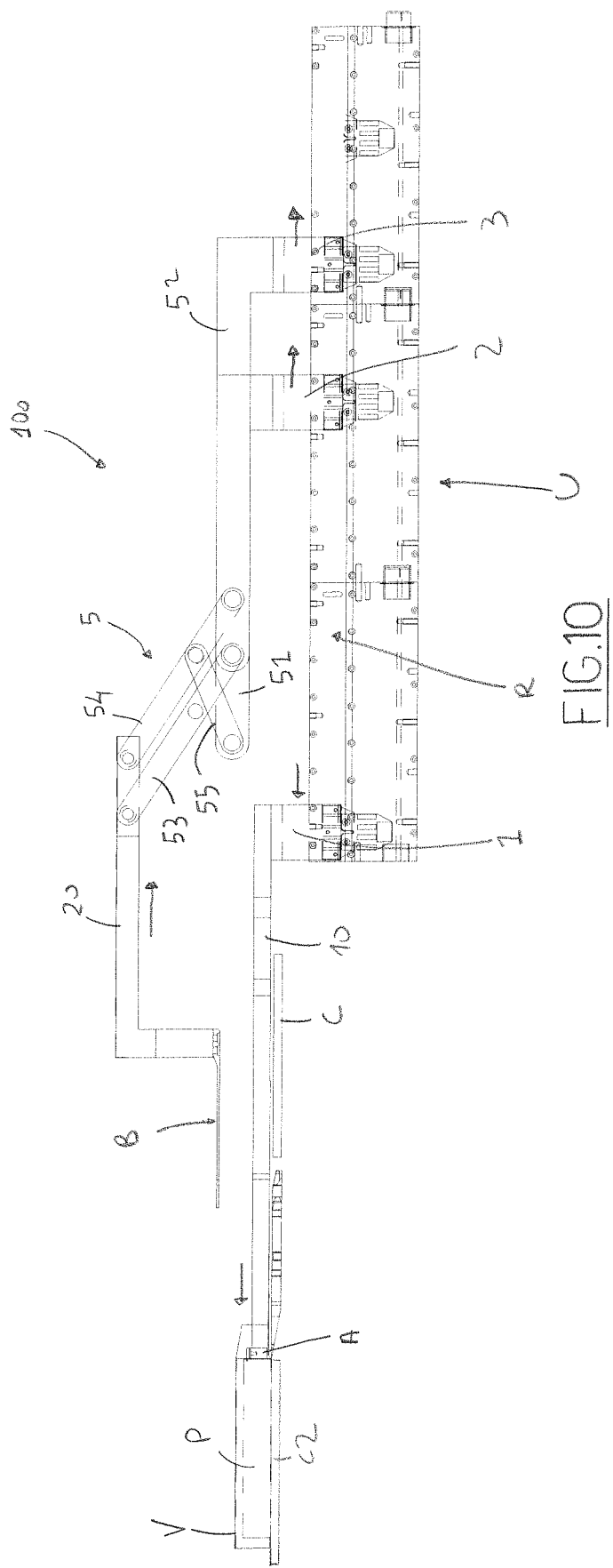

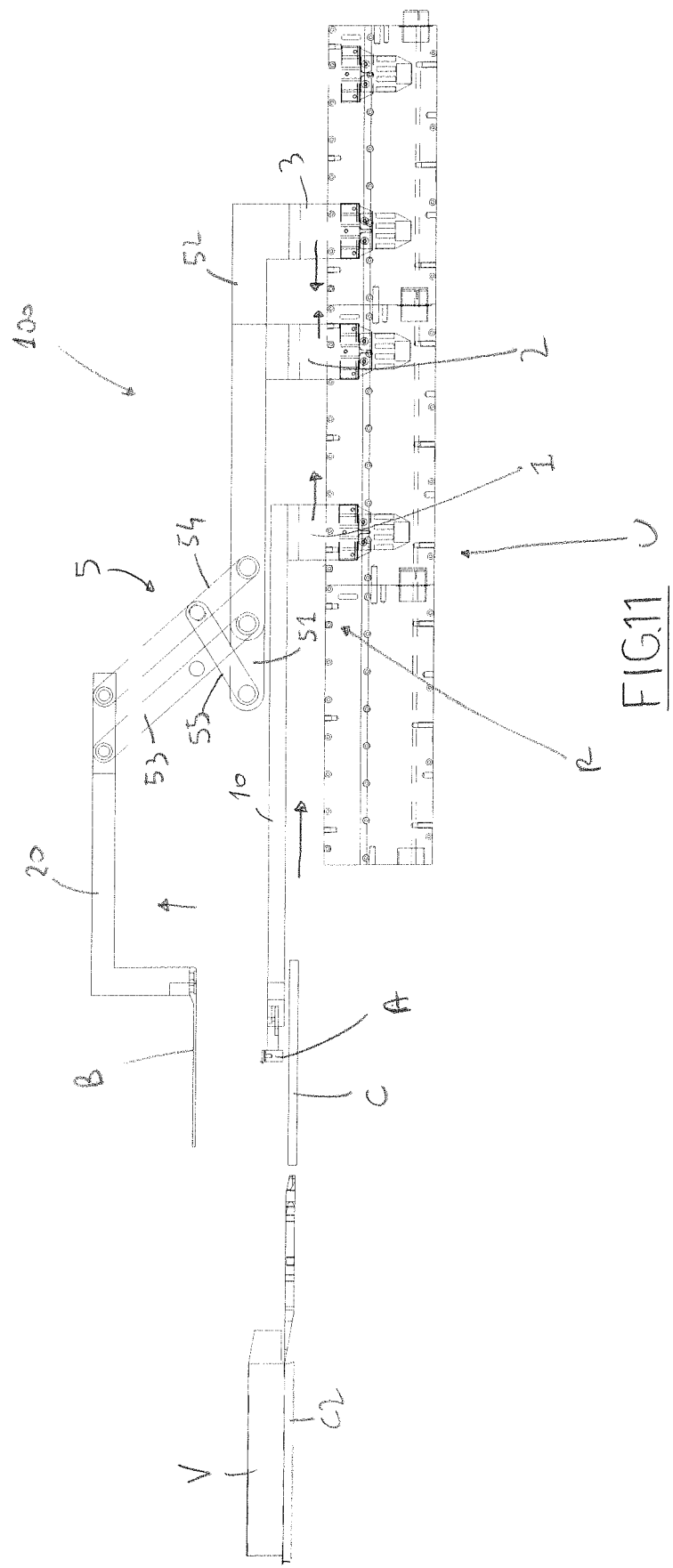

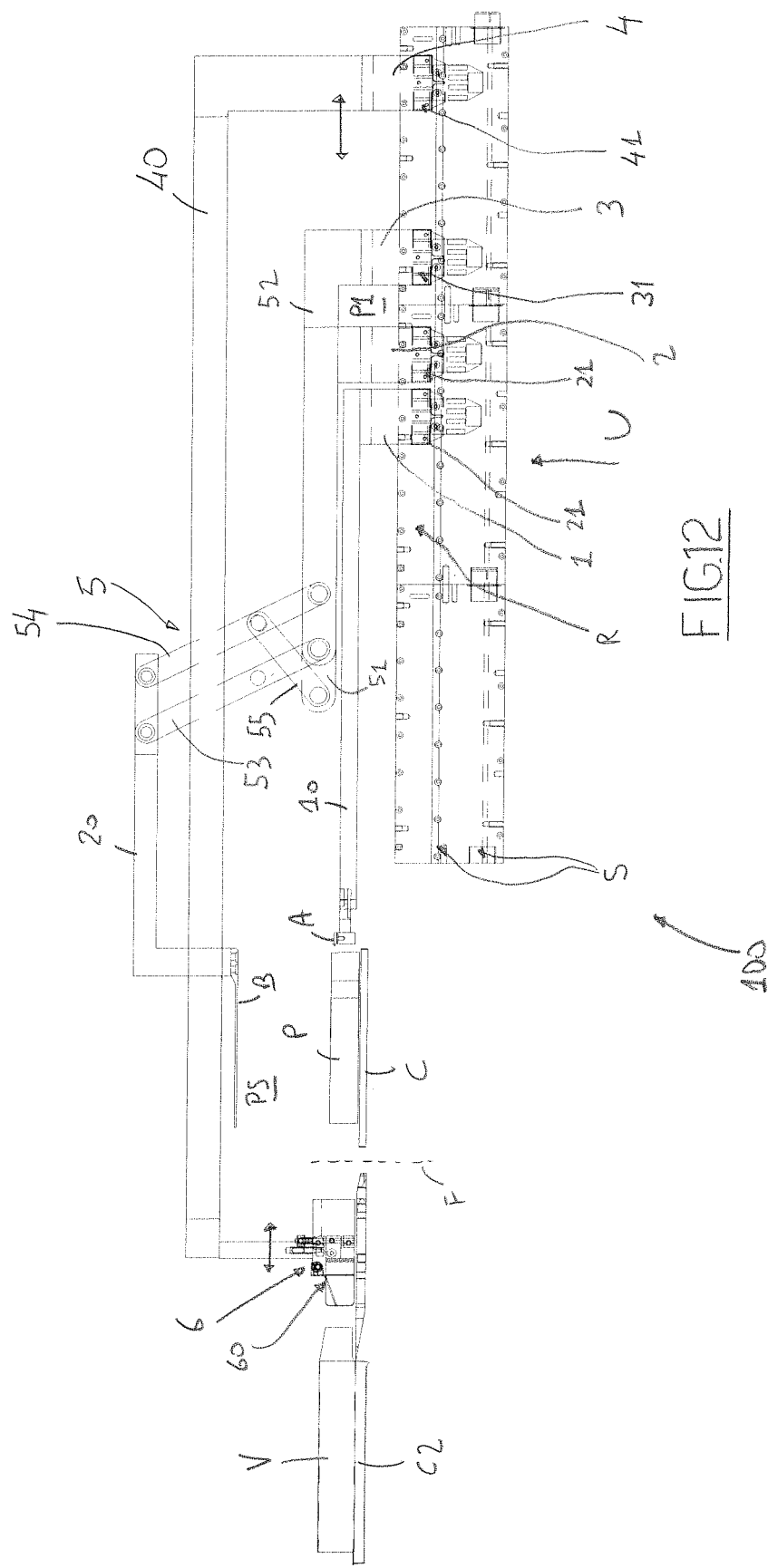

PUSHING APPARATUS FOR PUSHING AND TRANSFERRING

FIELD OF THE INVENTION

The present invention relates to the technical sector concerning automatic and semi-automatic apparatus, destined for transfer of products with the purpose of packaging them, such as for example boxing machines, designed to insert products, such as for example blister packs, inside cartons, or cartoning machines, designed to carry out the insertion of one or more products internally of cardboard boxes, or for storage thereof.

In particular, the present invention relates to a pushing apparatus for pushing and transferring products.

The pushing apparatus of the invention can be used, for example, for pushing and transferring products internally of relative cartons, or for pushing and transferring products internally of relative boxes, or, for example, also for pushing and transferring products from a first conveyor to a store.

In substance, the pushing apparatus of the invention can be used in all of those situations in which it is necessary to carry out a translation or transfer of products by application of a push on the products, performed by a pusher element (pusher).

Often, in the above-mentioned applications, the products that are to be pushed and transferred, for example in order to be inserted in cartons or boxes, require an upper accompanying element (usually known as a counter-pusher and constituted in general by a laminar element), for facilitating insertion thereof.

In other situations, the products must for example be slightly compacted, as they are constituted by sachets or other types of deformable products, before carrying out the insertion thereof into respective cartons or boxes: in these cases it is necessary to use an upper accompanying element which is lowered onto the products and which accompanies them during transfer thereof by means of the pusher element.

Also in the case in which the products to be transferred are stacked on one another, it is necessary to have recourse to the use of an upper accompanying element to prevent, during transport, that the transfer of the stack of products might become unassembled or fall apart.

Further, there are cases of packaging in which, as well as the product, a respective informative leaflet has to be inserted internally of a same carton or box.

In these circumstances too, especially when the product has low rigidity, or is deformable, such as for example in the case of blister packs, it is necessary to have recourse to the use of an upper accompanying element which must be driven in advance with respect to the pusher element of the product, to be positioned above the product, and to abut and push the informative leaflet into the carton, to prevent the product, pushed by the pusher element, from striking the leaflet and possibly bend or deform, complicating the insertion thereof into the carton.

In substance, in the various situations described in the foregoing, in which a pusher element is used to push and transfer a product, or a plurality of products in a stack, the use is required of an upper accompanying element which must lower onto the product, or the stack of products, and move, for example slightly in advance, together with the pusher element.

DESCRIPTION OF THE PRIOR ART

Usually, to push and transfer the products in the various situations described in the foregoing, the prior-art has recourse to the use of closed loop conveyors which are arranged flanked and parallel to the conveyors of the products that are to be pushed and transferred.

The closed loop conveyors are configured in such a way as to be able to move pusher elements in a parallel direction to the conveyor of the products, in order to be positioned facing the products, or in a transversal and perpendicular direction to the conveyor of the products, in order to be able to push and transfer them into a final position thereof (for example in a carton, or onto another conveyor).

In this regard, the pusher elements are borne by the carriages, which are mounted slidably on sliding guides constrained and moved by the closed loop conveyor in a parallel direction to the conveyor of the products.

The carriages are constrained to cam guides which are conformed in such a way that the carriages, during the movement of the sliding guides by the closed loop conveyor, are moved transversally and perpendicularly to the conveyor of the products, in such a way as to abut the products and push them, for example in order to transfer them onto another conveyor, of for example to push them internally of a carton, or a box transported by a respective conveyor located flanked to the conveyor of the products.

A type of apparatus of this kind has a complex structure, requiring numerous mechanical components, is not adaptable to an eventual size change of the products to be pushed and transferred, and is not able to guarantee high velocity of transfer of the products.

Document EP 3.157.819, in the name of the present Applicant, describes an apparatus for introducing blister packs and respective informative leaflets internally of cartons.

The blister packs, and cartons, into which the blister packs must be inserted, are transported by respective conveyors arranged parallel to one another.

The conveyor of informative leaflets is arranged between the conveyor of the cartons and the conveyor of the blister packs.

The apparatus described in the above-cited document is arranged flanked to the conveyor of the blister packs.

This apparatus comprises a first closed loop conveyor and a second closed loop conveyor.

The first closed loop conveyor is designed for the movement, in a parallel direction to the conveyors of the blister packs and the cartons, of first pusher elements.

The first pusher elements are mounted on first carriages, which are slidably mounted on first straight guides (bars) moved by the first closed loop conveyor in a parallel direction to the conveyors of the blister packs and the cartons.

The first carriages are constrained to first cam guides which are conformed in such a way that the first carriages can move towards and then away from the conveyors of the blister packs and the cartons, during the movement of the first straight guides by the first closed loop conveyor.

In this way, the first pusher elements can be moved in the advancement direction of the blister packs and the cartons and, at the same time, in a transversal direction to the advancement direction, moving towards and away from the conveyors of the blister packs and the cartons, in order to be able to push and transfer the blister packs into the cartons, then to be extracted from the cartons once the blister packs have been inserted.

The second closed loop conveyor is designed for the movement, in a parallel direction to the conveyors of the cartons and the informative leaflets, of second pusher elements, and is arranged above the first closed loop conveyor.

The second pusher elements are mounted on second carriages, which are slidably mounted on second straight guides (bars) moved by the second closed loop conveyor in a parallel direction to the conveyors of the cartons and the informative leaflets.

The second carriages are constrained to second cam guides which are conformed in such a way that the second carriages can move towards and then away from the conveyors of the cartons and the informative leaflets, during the movement of the second straight guides by the second closed loop conveyor.

In this way, the second pusher elements can be moved in the advancement direction of the cartons and the informative leaflets and, at the same time, in a transversal direction to the advancement direction, in moving towards and away from the conveyors of the cartons and the informative leaflets, in order to abut, push and transfer the informative leaflets into the cartons, and then be extracted from the cartons.

The apparatus described in this document is configured in such a way that the second pusher elements lower towards the blister packs, abut and push the informative leaflets into the cartons in advance with respect to the moment when the first pusher elements abut and push the blister packs into the cartons.

An apparatus of this type, though proven to be effective and functional in the insertion of the leaflets and the blister packs internally of respective cartons, has however a certain complexity, is not very flexible and adaptable in the case of a size change, as it requires replacing and adjusting numerous components, and, further, cannot reach very high velocities of insertion.

SUMMARY OF THE INVENTION

The aim of the present invention is therefore to provide a novel pushing apparatus for pushing and transferring products, able to obviate the above-mentioned drawbacks of the prior art described in the foregoing.

In particular, an aim of the present invention is to describe a pushing apparatus having a simple structure, easily adaptable to the size change and able to guarantee high velocity of transfer of the products.

The cited aims are attained with a pushing apparatus according to the contents of the claims.

BRIEF DESCRIPTION OF THE DRAWINGS

The characteristics of preferred, but not exclusive, embodiments of the pushing apparatus of the invention are described in the following with reference to the appended tables of drawings, in which:

FIGS. 7, 8, 9, 10 and 11 illustrate, according to respective schematic lateral views, a possible application of the pushing apparatus of the invention of FIG. 1, for carrying out the transfer of a product, or a stack of products, transported by a first conveyor internally of a carton, or a box, transported by a second conveyor;

FIG. 12 illustrates, in a schematic lateral view, a possible application of the pushing apparatus of FIG. 2, for carrying out the transfer of a product, or a stack of products, transported by a first conveyor internally of a carton, or a box transported by a second conveyor.

DESCRIPTION OF THE PREFERRED EMBODIMENTS

Figure 1:
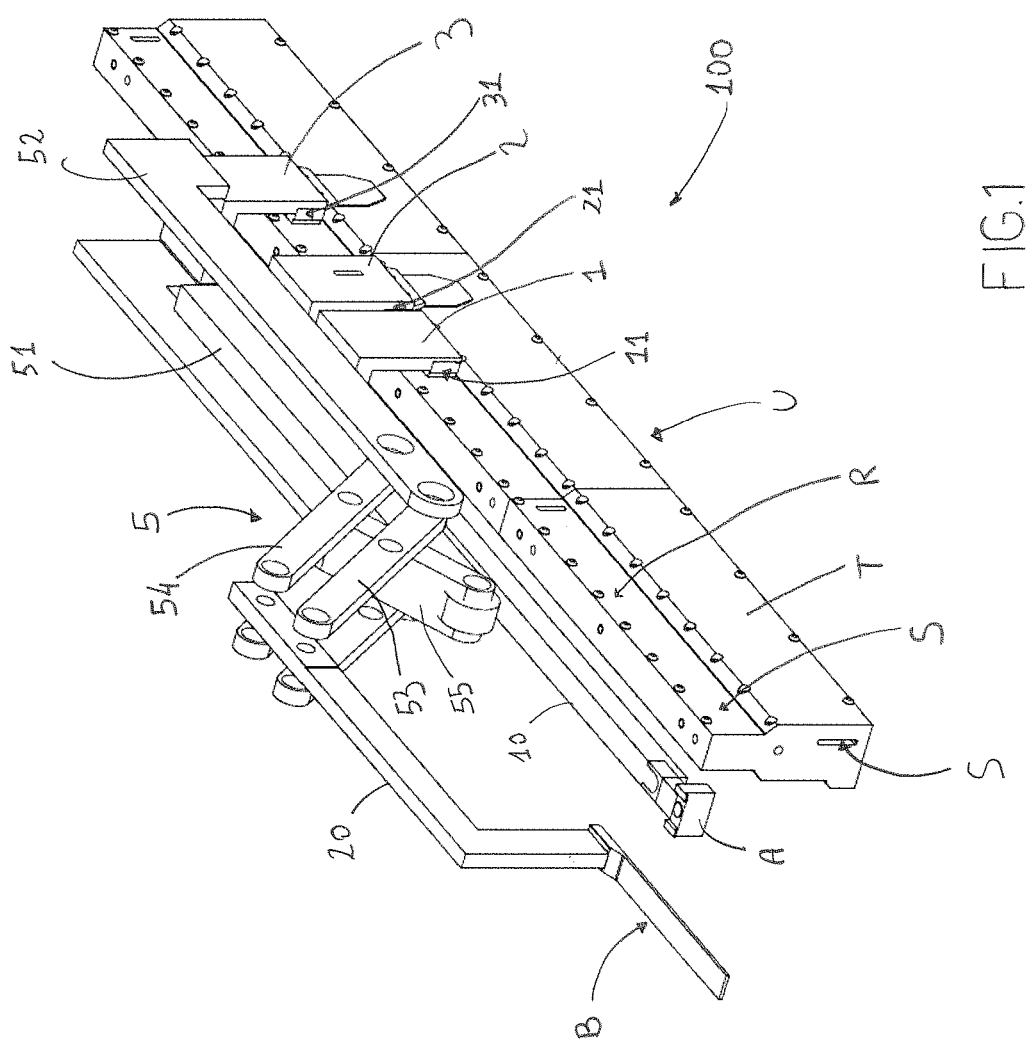
FIG. 1 illustrates, in a schematic perspective view, a possible embodiment of the pushing apparatus of the invention.

With reference to the appended tables of drawings, reference numeral (100) denotes the pushing apparatus for pushing and transferring products, object of the present invention in its entirety.

The pushing apparatus (100) comprises a pusher element (A), conformed so as to abut a side of a product (P), or a group (P) of products (for example a stack of products), which is arranged on a conveyor (C) and which is to be pushed and transferred along a transfer direction (Z) transversal to the conveyor (C).

The pushing apparatus (100) further comprises a counter-pusher element (B) (for example a laminar element) which is conformed and dimensioned so as to be positionable above and facing the product (P), or the group (P) of products, arranged on the conveyor (C) and which is to be pushed and transferred along a transfer direction (Z) transversal to the conveyor (C) by means of the pusher element (A).

The product (P), the group (P) of products, which is to be pushed, is usually fed in by a conveyor (C) and must be transferred, transversally to the conveyor (C), for example on a second conveyor (C2) arranged flanked to the conveyor (C), or inside a container (V) (for example a carton or box) which is fed in by a second conveyor (C2) arranged flanked to the conveyor (C), or also on a storing station arranged flanked to the conveyor.

In substance, in other words, the pushing apparatus (100) of the invention finds application in any situation in which there is a request to push and transfer a product, or a group of products, transversally with respect to a position in which the product, or a group of products, is positioned, for example by a conveyor, or transversally with respect to an infeed direction along which the product, or group of products, is advanced by a conveyor.

In order to perform this function, the special characteristics of the pushing apparatus (100) of the invention consist in the fact that it comprises a linear driving unit (U) for movement of the pusher element (A) and of the counter-pusher element (B).

Figure 2:
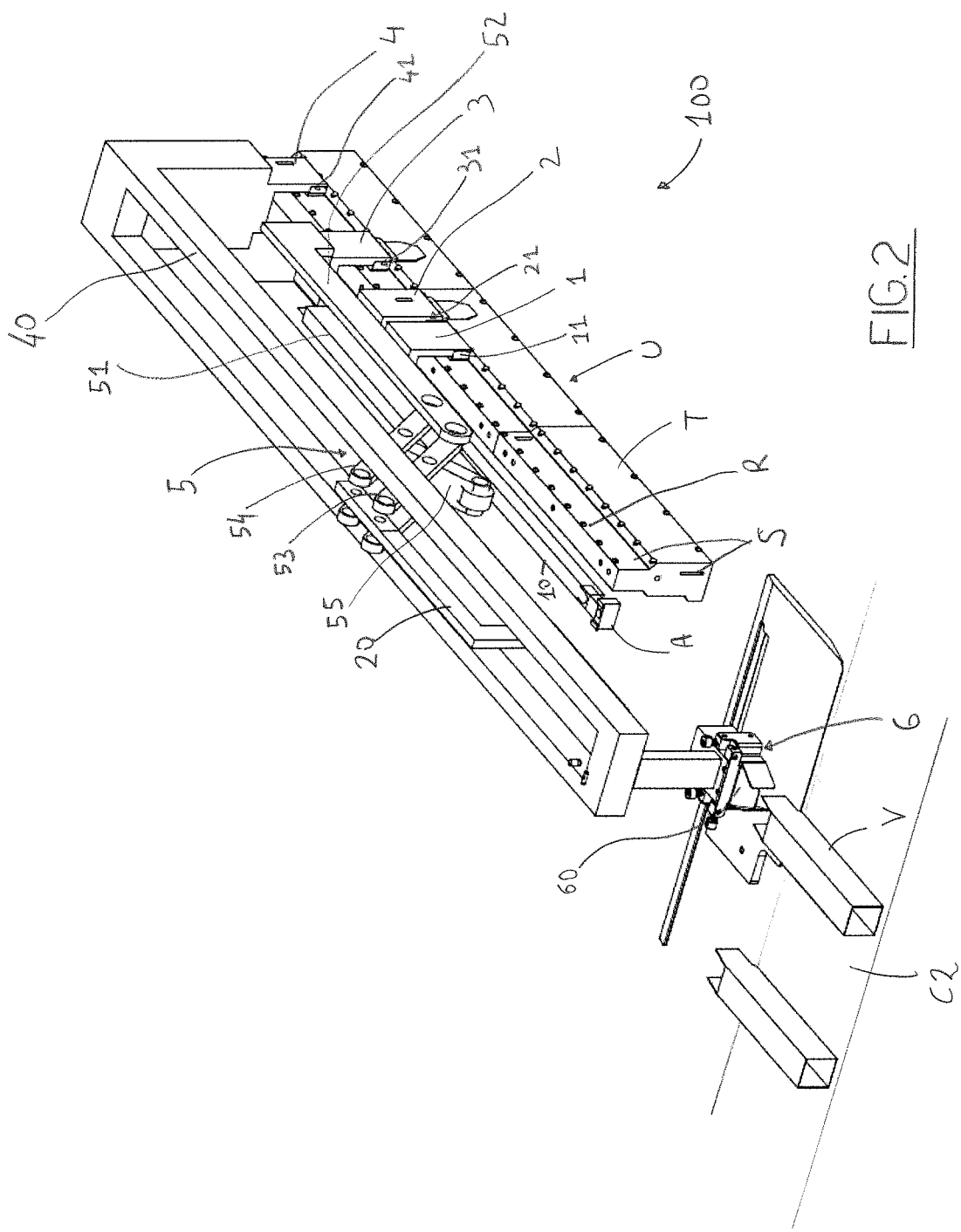
FIG. 2 illustrates, again in a schematic perspective view, a second possible embodiment of the pushing apparatus of the invention.

The linear driving unit (U) comprises (see for example FIGS. 1 and 2):

a frame (T);

a straight guide (R) which is mounted on the frame (T);

a stator (S), which is arranged in the frame (T) and configured in such a way as to be able to generate a variable magnetic field along the straight guide (R) (in the figures the stator has been symbolically represented by the indications of relative arrows and with the reference (S) as it is predisposed and placed internally of the frame (T), and therefore not visible from outside, and can be constituted by a series of coils that can be powered with current);

a first carriage (1) which is slidably mounted (for example by means of respective sliding rollers not visible in the figures) on the straight guide (R) and comprising permanent magnets (11);

a second carriage (2) slidably mounted (for example by means of respective sliding rollers not visible in the figures) on the straight guide (R) and comprising permanent magnets (21);

a third carriage (3) slidably mounted (for example by means of respective sliding rollers not visible in the figures) on the straight guide (R) and comprising permanent magnets (31).

The linear driving unit (U), as illustrated for example in figures from 3 to 12, is positionable laterally to the conveyor (C) which feeds in the product (O), or the group (P) of products, to be transferred into a given position or which moves the product (P), or the group (P) of products, along an infeed direction, in such a way that the straight guide (R) is arranged transversal to the conveyor (C).

In detail, the linear driving unit (U) is configured in such a way that the stator (S) is activatable in order to generate a variable magnetic field along the straight guide (R) so as to interact with the permanent magnets (11) of the first carriage (1), with the permanent magnets (21) of the second carriage (2) and with the permanent magnets (31) of the third carriage (3) and move the first carriage (1), the second carriage (2) and the third carriage (3), independently of one another, along the straight guide (R) towards or away from the conveyor (C).

The pushing apparatus (100) further comprises:

a first support member (10), for supporting the pusher element (A), which is mounted on the first carriage (1) in such a way as to be parallel to the straight guide (R);

a second support member (20) for supporting the counter-pusher element (B);

and an articulate system (5) for supporting the second support member (20) and for moving the second support member (20) with respect to the first support member (10), and thus moving the counter-pusher element (B) with respect to the pusher element (A).

The articulate system (5) is predisposed and configured:

to maintain the second support member (20) parallel to the first support member (10) and above the first support member (10);

so as to be drivable by means of the movement of the second carriage (2) and the third carriage (3).

In greater detail, the articulate system (5) is predisposed and configured in such a way that:

when the second carriage (2) and the third carriage (3) are in a neared position (P1) with respect to one another (see for example FIG. 3, FIG. 7 and FIG. 12) the articulate system (5) maintains the second support member (20), and therefore the counter-pusher element (B), in a raised position (PS) above the conveyor (C), and when the second carriage (2) and the third carriage (3) are reciprocally moved along the straight guide (R), by means of the magnetic field generated by the stator (S), so as to be reciprocally positioned in a position (PD) in which the second carriage (2) and the third carriage (3) are moved away and distanced from one another (see FIG. 4 and FIG. 8), the articulate system (5) moves the second support member (20), and therefore the counter-pusher element (B), into a lowered position (PA) towards the conveyor (C) so that the counter-pusher element (B) is arranged above and facing the product (P), or the group (P) of products, arranged on the conveyor (C).

Figure 3:
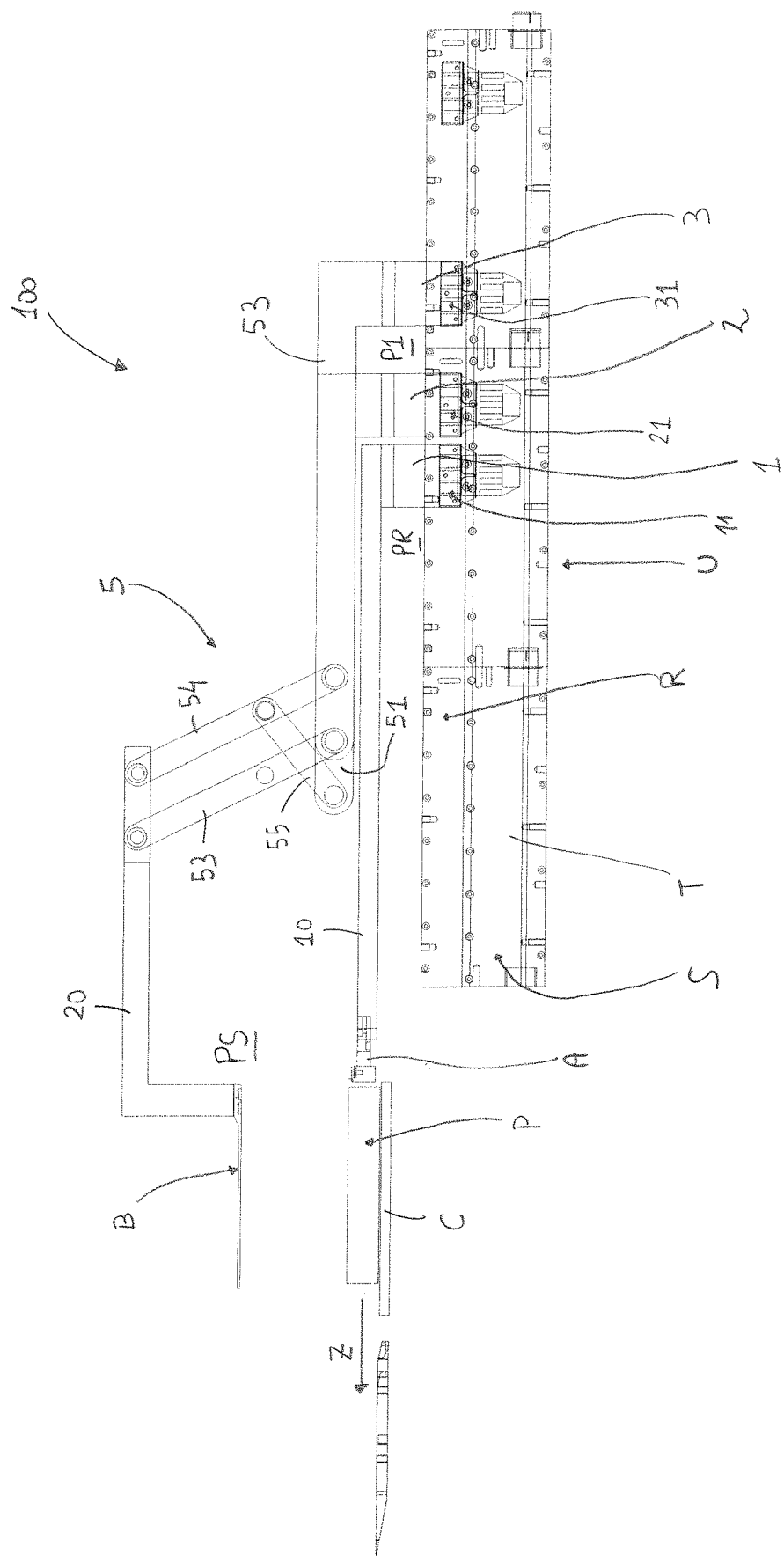
FIGS. 3, 4, 5 and 6 illustrate, according to respective schematic lateral views, a possible application of the pushing apparatus of the invention of FIG. 1, for carrying out the transfer of a product, or a stack of products, from a first conveyor to a second conveyor (or store)
Figure 4:
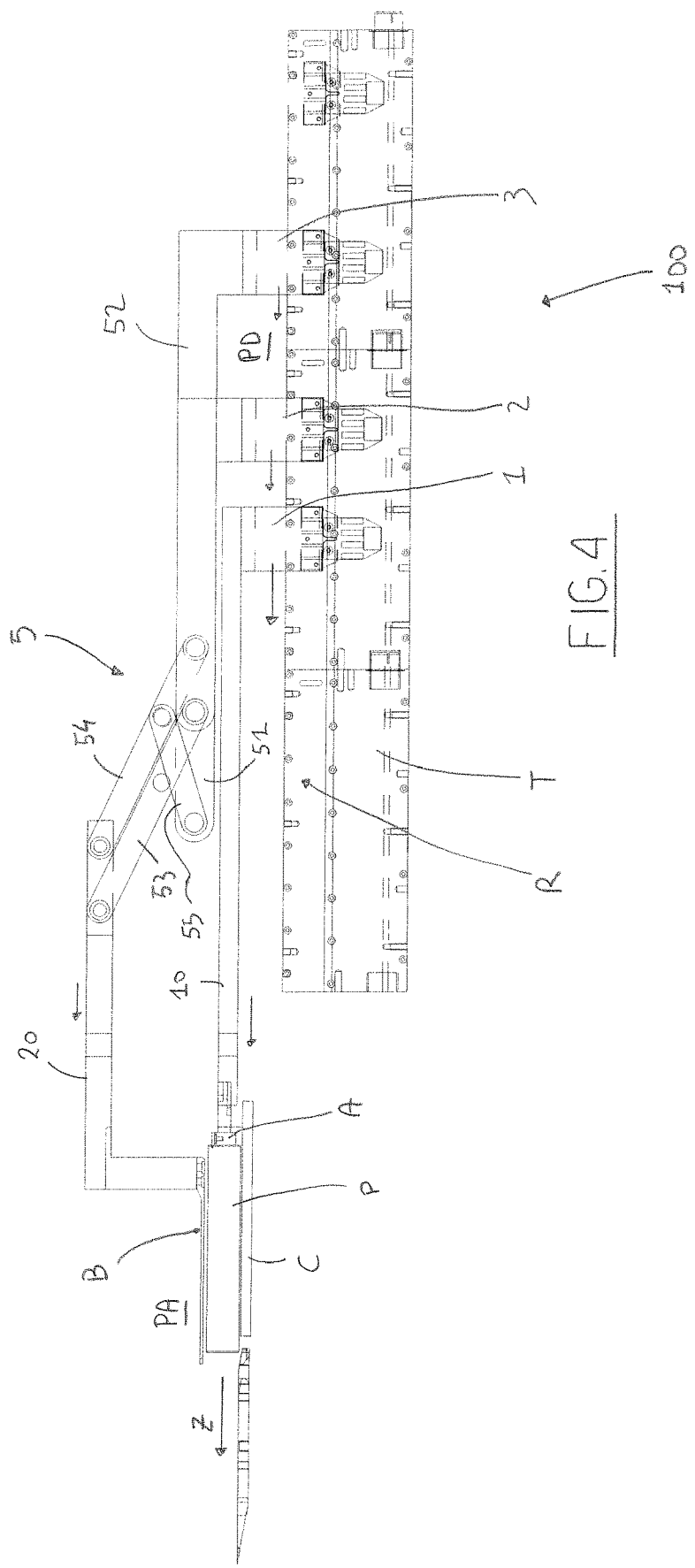
Figure 5:
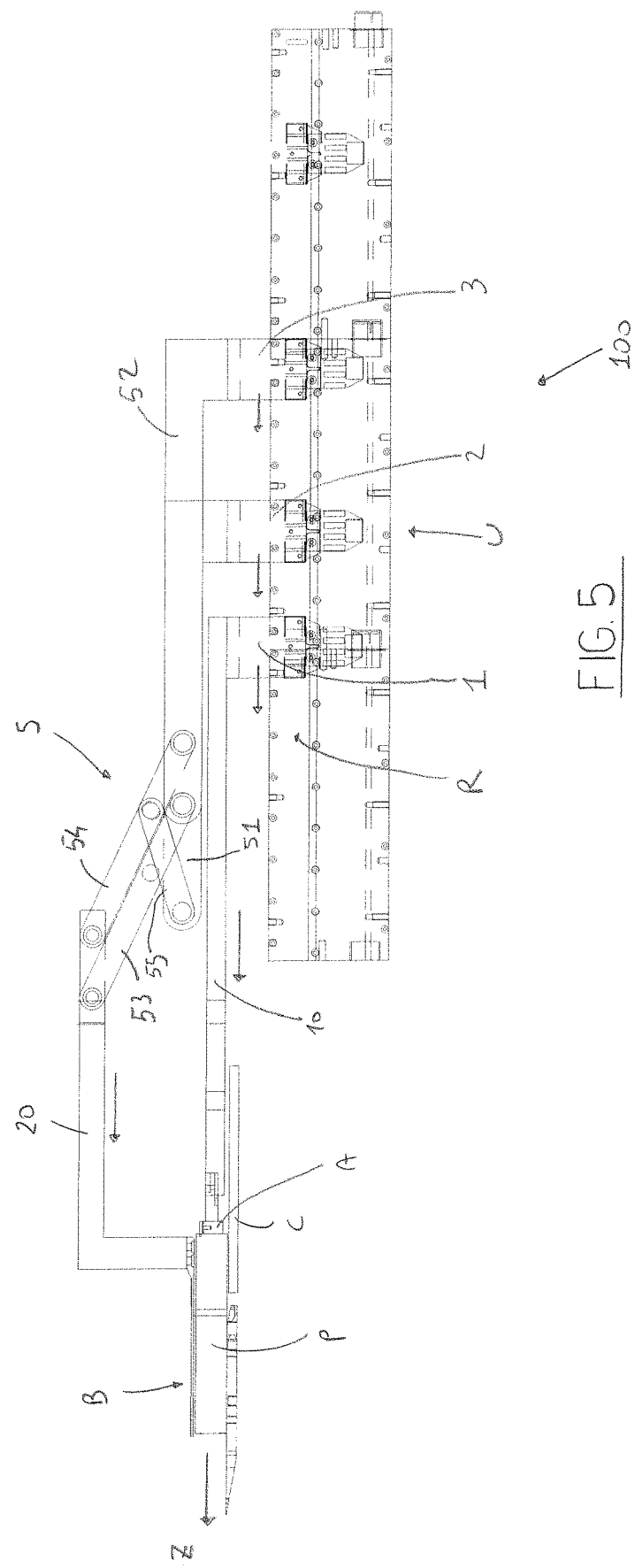
Figure 8:
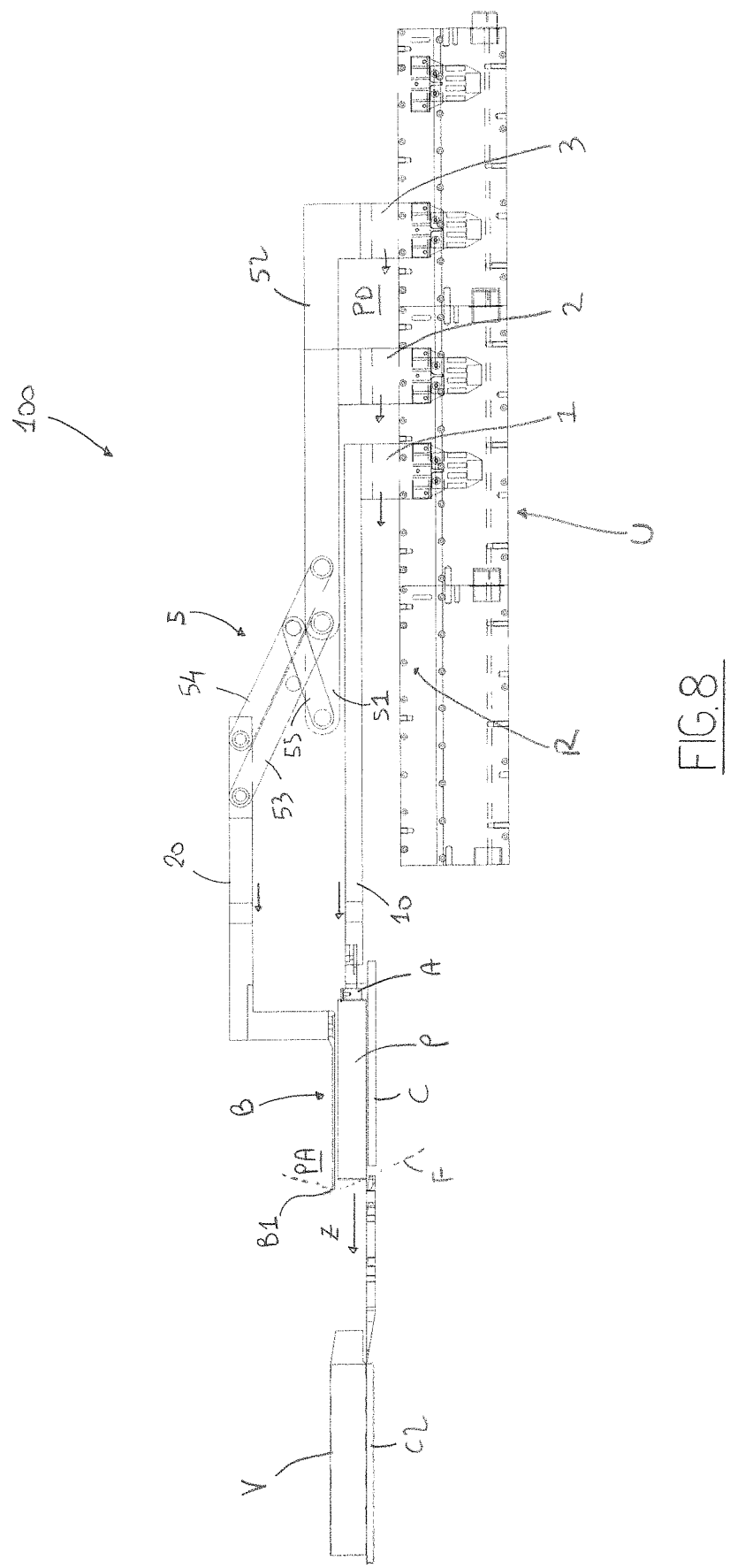
Figure 9:
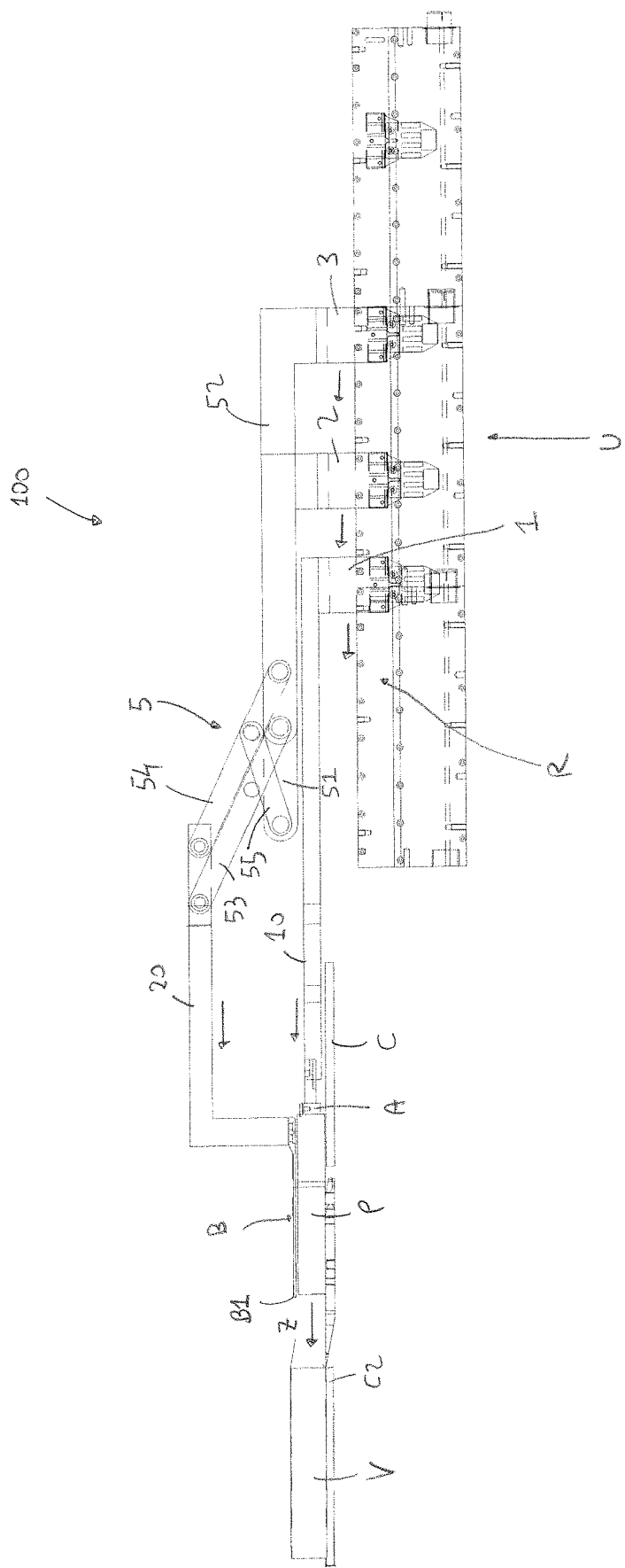

The pushing apparatus (100) of the invention, in order to push and transfer the product (P), or the group (P) of products, arranged on the conveyor (C) in a transfer direction (Z) that is transversal to the conveyor (C), is configured in such a way that, starting from a configuration in which the first carriage (1) is in a retracted position (PR) with respect to the conveyor (C) so that the pusher element (A) is arranged laterally of the conveyor (C) and with the second carriage (2) and the third carriage (3) positioned in a neared position (P1) to one another so that the counter-pusher element (B) is positioned in the raised position (PS) above the conveyor (C) (situation illustrated in FIG. 3, FIG. 7, FIG. 12), the stator (S) is activatable in order to generate a variable magnetic field along the straight guide (R) so that:

firstly, the second carriage (2) and the third carriage (3) are reciprocally moved along the straight guide (R) by means of the magnetic field generated by the stator (S) in order to be positioned in a position (PD) in which the second carriage (2) and the third carriage (3) are moved away and distanced from one another (see FIG. 4 and FIG. 8) by a distance such that the articulate system (5) moves the second support member (20), and therefore the counter-pusher element (B), from the raised position (PS) to the lowered position (PA) in order to bring the counter-pusher element (B) to be arranged above and facing the product (P), or the group (P) of products, arranged on the conveyor (C);

and then the first carriage (1), the second carriage (2) and the third carriage (3) are moved along the straight guide (R) by means of the magnetic field generated by the stator (S) in order to be contemporaneously moved towards the conveyor (C) in order to translate the first support member (10) and the second support member (20) transversally to the conveyor (C) so that the pusher element (A) abuts the product (P), or the group (P) of products, arranged on the conveyor (C) and pushes and transfers the product (P), or the group (P) of products, along a transfer direction (Z) that is transversal to the conveyor (C), with the counter-pusher element (B) remaining arranged above and facing the product (P), or the group (P) of products, at least during a first part of transfer of the product (P), or of the group (P) of products (see for example the sequence illustrated by FIGS. 3, 4 and 5, or the sequence illustrated by FIGS. 8 and 9).

In this regard, the first carriage (1), the second carriage (2) and the third carriage (3) are moved along the straight guide (R), towards and in a nearing direction to the conveyor (C) so as to maintain a same reciprocal distance there-between.

Therefore, the pushing apparatus of the invention, by the simple linear movement of the three carriages along the straight guide, is able to push and transfer a product, or a group of products, in a translation direction by means of the linear translation of the pusher element and, at the same time, maintain a counter-pusher element above and facing the product, or group of products.

The pushing apparatus of the invention thus has a much simpler structure with respect to the apparatus of known type described in the foregoing, as the pusher element and the counter-pusher element are movable by means of the linear movement of the three carriages along the straight guide, and to carry out the movement no mechanical gears or motors are required, as it is obtained by means of the magnetic field generated by the stator that interacts with the permanent magnets mounted on the carriages.

Further, and owing to this movement modality, with the pushing apparatus of the invention it is also possible to reach transfer velocities of the product, or group of products, that are high and greater than those attainable by the pushing apparatuses of known type.

Further, in a case where the product, or the group of products, which is to be transferred, instead of being stopped and placed by the conveyor (C) in a given position, is advanced in continuous mode by the conveyor (C), then the frame (T) of the pushing apparatus (100) can be predisposed mounted on a respective conveyor, for example in a closed loop, drivable in synchrony with the conveyor (C) in such a way that the straight guide is maintained opposite and transversal to the product or group of products, in order to allow the pusher element and the counter-pusher element to perform the transfer by means of the movement of the carriages along the straight guide in the ways previously described.

Further and other advantageous aspects and details of the pushing apparatus of the present invention are described in the following.

Figure 6:
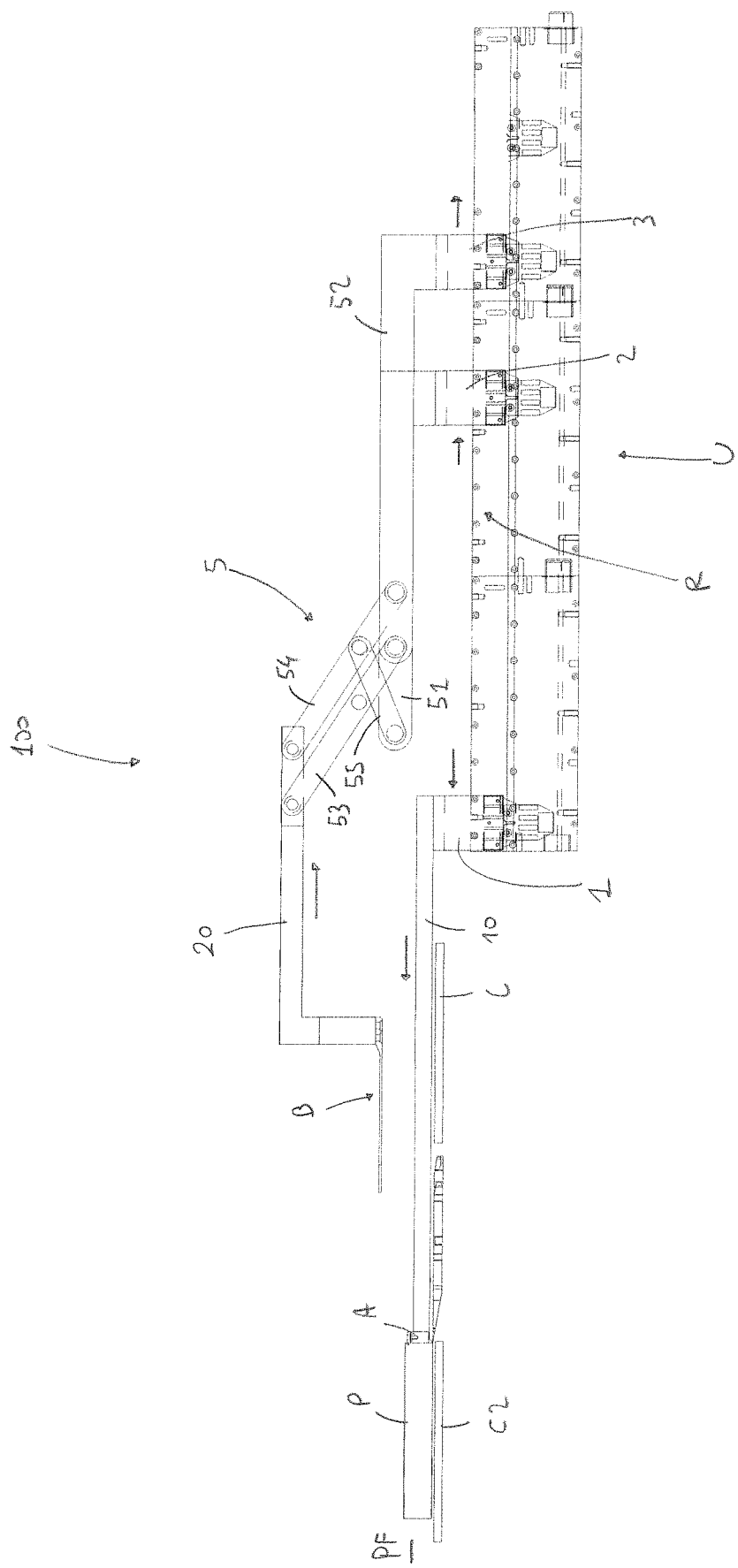

In a particularly advantageous aspect, the pushing apparatus (100) is configured in such a way that, after a first part of the transfer of the product (P), or of the group (P) of products, the stator (S) is activatable to generate a variable magnetic field along the straight guide (R) in such a way that (see for example FIG. 6):

while the first carriage (1) continues to be moved towards the conveyor (C) in order to continue to push and transfer the product (P), or the group (P) of products, along a transfer direction (Z) that is transversal to the conveyor (C) towards a final transfer position (PF) (for example arranged at a second conveyor (C2), or internally of a container (V) arranged on the second conveyor (C2), or arranged on a storage plane), the second carriage (2) and the third carriage (3) can be moved contemporaneously away from the conveyor (C) in order to retract the counter-pusher element (B) with respect to the product (P), or the group (P) of products.

Once the transfer of the product or of the group of products into the final position has been completed, the first carriage (1) to can be moved along the straight guide (R) in a moving away direction from the conveyor (C) in order to be returned into the initial retracted position (PR), in order to return the pusher element (A) into the position flanked to the conveyor (FIG. 3); at the same time, the second carriage (2) and the third carriage (3) can also be moved away from the conveyor (C) and returned into the neared position (P1) thereof, so that, via the corresponding movement of the articulate system (5), the counter-pusher element (B) can also be returned into the raised position (PS).

The retraction of the counter-pusher element (B) with respect to the pusher element (A) still in the translation step for the transfer of the product, or of the group of products, is particularly advantageous in the case in which the product, or the group of products, has to be transferred internally of a container (V) (situation illustrated in figures from 7 to 11).

In this case, the pushing apparatus (100) is configured in such a way that, after a first part of the transfer of the product (P), or of the group (P) of products, the stator (S) is activatable to generate a variable magnetic field along the straight guide (R) in such a way that: while the first carriage (1) continues to be moved towards the conveyor (C) in order to continue to push and transfer the product (P), or the group (P) of products, transversally beyond the conveyor (C) to insert the product (P), or the group (P) of products, into a container (V) arranged by a side of the conveyor (C), the second carriage (2) and the third carriage (3) can at the same time be moved away from the conveyor (C) in order to retract the counter-pusher element (B) with respect to the product (P), or the group (P) of products, and thus enable the pusher element (A) to push and transfer the product (P), or the group (P) of products, completely inside the container (V).

In this way, the counter-pusher element can accompany the product, or group of products, pushed by the pusher element at least up to immediately prior to the start of the insertion thereof into the container (V).

On the basis of the stroke of the second and third carriage, the counter-pusher element can possibly also insert partially internally of the container so as to accompany the product, or the group of products, into the container.

This can be useful in a case of a group of products arranged in a stack on one another.

A further advantageous aspect of the pushing apparatus (100) of the invention consists in the fact that the articulate system (5) is further configured so that, when the second carriage (2) and the third carriage (3) are reciprocally moved in order to be distanced from one another, the articulate system (5) moves the second support member (20), and therefore the counter-pusher element (B), into a lowered position (PA) towards the conveyor (C) so that the counter-pusher element (B) is arranged above and facing the product (P), or the group (P) of products, arranged on the conveyor (C) and with a respective end (B1) arranged in an advanced position beyond a second side of the product (P), or of the group (P) of products, opposite the side on which the pusher element (A) is to act (see for example FIGS. 4, 8 and 9).

This particularity is especially advantageous in a case in which it is required to transfer products having a low degree of rigidity, or deformable, such as for example blister packs, internally of a carton together with the inserting of a respective informative leaflet.

For example, as illustrated in figures from 7 to 12, the product (P) (for example a blister pack, or blister packs stacked on one another) is fed along a conveyor (C) and must be transferred into a carton (V) arranged on a second conveyor (C2), located flanked to the conveyor (C).

Figure 7:
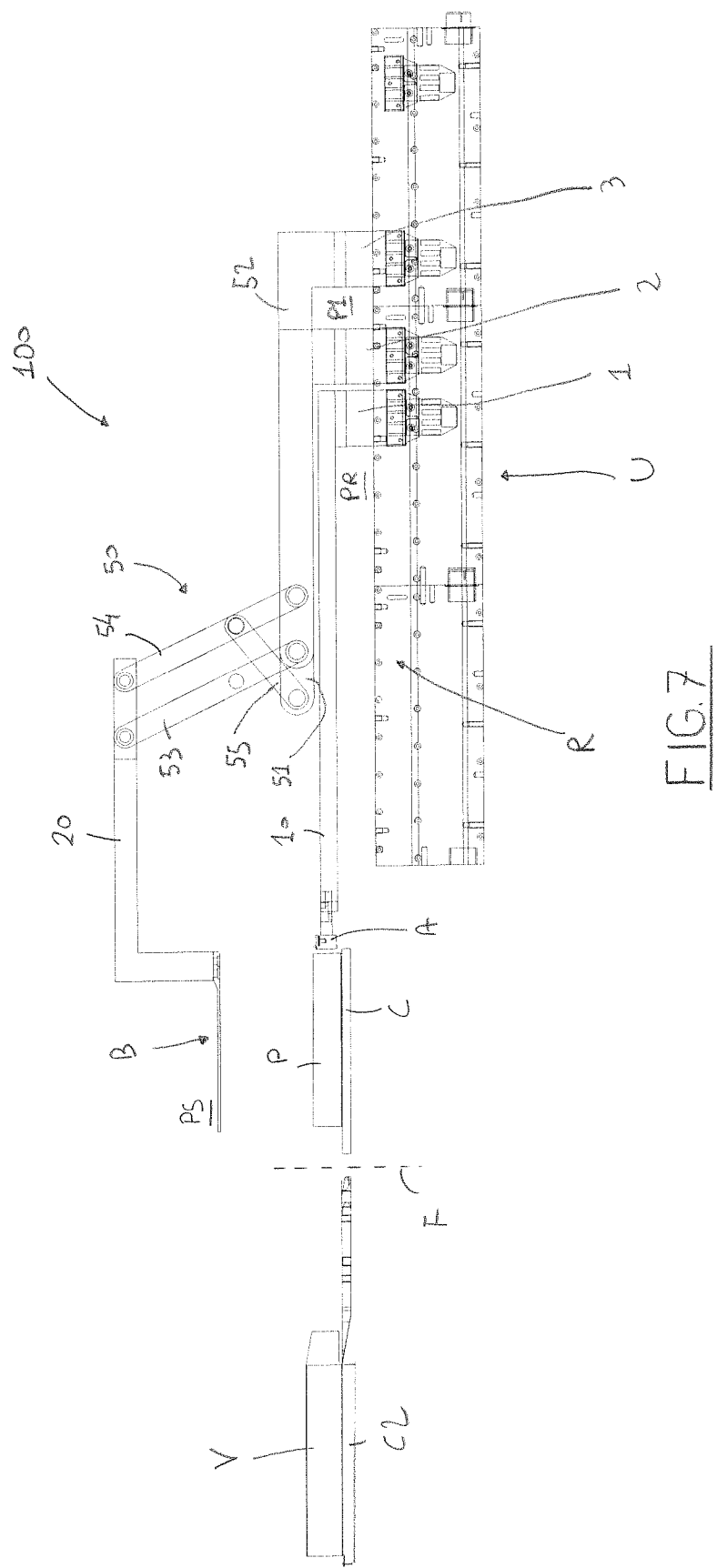

The leaflets to be inserted into the carton (C) together with the product (P) are fed in by a respective conveyor arranged between the conveyor of the product and the conveyor of the cartons (the figures do not contain a detailed illustration of the leaflets and the relative conveyor, in FIGS. 7, 8 and 12 a leaflet (F) is only denoted schematically and generically, and using dotted lines)).

The fact that the counter-pusher element (B), when brought into the relative lowered position (PA), above and facing the product (P), has a relative end (B1) which is arranged in an advanced position, therefore projecting, beyond the product (P), enables the counter-pusher element (B) to abut the leaflet and to start the folding step thereof for insertion into the carton without the product, pushed by the pusher element, striking against the actual leaflet.

A further particular advantageous aspect of the pushing apparatus of the invention consists in the fact that it can be configured in such a way that the stator (S), starting from a configuration in which the second carriage (2) and the third carriage (3) are placed in a position (P1) neared to one another, can be activated to generate variable magnetic fields such that the second carriage (2) and the third carriage (3) can be reciprocally moved in such a way as to be moved away and distanced from one another at different distances, the articulate system (5) being configured in such a way as, when the second carriage (2) and the third carriage (3) are reciprocally moved so as to be distanced from one another at different distances, to move the second support element (20), and therefore the counter-pusher element (B), from the raised position (PS) to respective different distinct lowered positions in order to position the counter-pusher element (B) at different heights with respect to the conveyor (C), in such a way as to adjust to any size-changes of the product (P), or of the group (P) of products.

The pushing apparatus (100) of the invention is therefore flexible and adaptable to a possible size change of the product or of the group of products to be transferred, without having to resort to replacements and/or adjustments of components, but simply by positioning the second carriage and the third carriage at reciprocally different distances.

In the preferred embodiments illustrated in the figures, the first carriage (1) is arranged in front of the third carriage (3) with respect to the conveyor (C) of the product (P), or of the group (P) of products, to be pushed and transferred along a transfer direction (Z) that is transversal to the conveyor (C), with the second carriage (2) being arranged interposed between the first carriage (1) and the third carriage (3).

Other arrangements of the carriages can also be possible.

In the preferred embodiments illustrated in the figures, the articulate system (5) is configured in such a way as to comprise:
- a first arm (51), which is mounted on the second carriage (2) in such a way as to be parallel to the straight guide (R);
- a second arm (52), mounted on the third carriage (3) in such a way as to be parallel to the straight guide (R) and to the first arm (51);
- at least a pair of rods (53, 54) which are hinged, at a respective first end, to the second arm (52), and at a respective second end thereof, to the second support element (20) in such a way as to be parallel to one another;
- a lever (55), which is hinged at a respective first end to the first arm (51) and hinged at a second end to at least a rod (54) of the pair of rods (53, 54).

In the illustrated embodiments, the lever (55) is hinged to the end of the first arm (51) and to the rear rod (54) (with respect to the position of the conveyor) of the pair of rods (53, 54).

Other arrangements are also possible, for example the lever (55) can be hinged to the front rod (53) of the pair of rods (53, 54), or in another position on the first arm (51).

The pair of rods (53, 54) enables maintaining the second support (20) parallel to the first support (10) during the movement of the second support (20), and thus of the counter-pusher element (B), from the raised position (PS) to the lowered position (PA), and vice versa.

The movement of the second support is made possible by the relative movement between the first arm (51) and the second arm (53) (following the relative movement between the second carriage and the third carriage in reciprocal moving away from one another) which causes a rotation of the lever (55) and therefore of the pair of rods.

In the figures, the second support (20) has an L-shape, with a first arm of the L being the one to which the rods of the pair of rods are hinged, in order to be maintained parallel to the first support (10), and with the second arm of the L bearing the counter-pusher element (B).

In the preferred embodiment illustrated in figures from 2 to 12, the pushing apparatus (100) can be realised in such a way as also to comprise:
- a fourth carriage (4), which is slidably mounted on the straight guide (R) and comprising permanent magnets (41),
- a hopper (6), which is conformed in such a way as to comprise a passage tunnel (60) for the passage of a product (P), or a group (P) of products, to be inserted in a container (V) arranged on a second conveyor (C2) by a side of the conveyor of the product (P), or of the group (P) of products,
- a third support element (40), which is mounted on the fourth carriage (4) in such a way as to be parallel to the straight guide (R).

The fourth carriage (4) is positioned posteriorly to all three carriages (first, second and third carriage) and in a respective retracted position along the straight guide (R), with the third support element (40) having a length such that the hopper (6) is positioned between the conveyor (C) of the product (P), or of the group (P) of products, and the second conveyor (C2).

The stator (S) is activatable in order to generate a variable magnetic field along the straight guide (R) to move the fourth carriage (4), starting from the retracted position, in a nearing direction to the conveyor (C) of the product (P), or of the group (P) of products, in order to move the hopper (6) towards the mouth of the container (V) into which the product (P), or the group (P) of products, is to be inserted, for facilitating insertion thereof. Once the insertion has been carried out, the fourth carriage (4) can be moved to be returned into the retracted initial position.

The invention claimed is:

1. A pushing apparatus for pushing and transferring products, comprising:
   a pusher element, conformed so as to abut a side of a product, or a group of products, arranged on a conveyor and which is to be pushed and transferred along a transfer direction (Z) transversal to the conveyor;
   a counter-pusher element, conformed and dimensioned so as to be positionable above and facing the product, or the group of products, arranged on the conveyor and which is to be pushed and transferred along a transfer direction (Z) transversal to the conveyor by means of the pusher element;
   characterised in the pushing apparatus:
   a linear driving unit comprising:
   a frame;
   a straight guide mounted on the frame;
   a stator arranged in the frame and configured in such a way as to be able to generate a variable magnetic field along the straight guide;
   a first carriage slidably mounted on the straight guide and comprising permanent magnets;
   a second carriage slidably mounted on the straight guide and comprising permanent magnets;
   a third carriage slidably mounted on the straight guide and comprising permanent magnets;
   the linear driving unit is positionable laterally to the conveyor in such a way that the straight guide is arranged transversal to the conveyor;
   wherein the linear driving unit is configured in such a way that the stator is activatable in order to generate a variable magnetic field along the straight guide so as to interact with the permanent magnets of the first carriage, with the permanent magnets of the second carriage and with the permanent magnets of the third carriage and move the first carriage, the second carriage and the third carriage, independently of one another, along the straight guide towards or away from the conveyor;

the pushing apparatus further comprising:

a first support member, for supporting the pusher element, mounted on the first carriage in such a way as to be parallel to the straight guide;

a second support member for supporting the counter-pusher element;

an articulate system for supporting the second support member and for moving the second support member with respect to the first support member, and thus moving the counter-pusher element with respect to the pusher element, the articulate system is predisposed and configured to be activatable by means of the movement of the second carriage and the third carriage and is configured to maintain the second support member parallel to the first support member and above the first support member, wherein the articulate system is further configured so that, when the second carriage and the third carriage are in a neared position with respect to one another, the articulate system maintains the second support member, and therefore the counter-pusher element, in a raised position above the conveyor, and wherein, when the second carriage and the third carriage are reciprocally moved along the straight guide, by means of the magnetic field generated by the stator, so as to be reciprocally positioned in a position (PD) in which the second carriage and the third carriage are moved away and distanced from one another, the articulate system moves the second support member, and therefore the counter-pusher element, into a lowered position (PA) towards the conveyor so that the counter-pusher element is arranged above and facing the product, or the group of products, arranged on the conveyor;

wherein, in order to push and transfer the product, or the group of products, arranged on the conveyor in a transfer direction (Z) that is transversal to the conveyor, the pushing apparatus is configured in such a way that, starting from a configuration in which the first carriage is in a retracted position with respect to the conveyor so that the pusher element is arranged laterally of the conveyor and with the second carriage and the third carriage positioned in a neared position (P1) to one another so that the counter-pusher element is positioned in the raised position (PS) above the conveyor, the stator is activatable to generate a variable magnetic field along the straight guide so that:

firstly, the second carriage and the third carriage are reciprocally moved along the straight guide by means of the magnetic field generated by the stator in order to be positioned in a position (PD) in which the second carriage and the third carriage are moved away and distanced from one another by a distance such that the articulate system moves the second support member, and therefore the counter-pusher element, from the raised position to the lowered position (PA) in order to bring the counter-pusher element to be arranged above and facing the product, or the group of products, arranged on the conveyor;

and then the first carriage, the second carriage and the third carriage are moved along the straight guide by means of the magnetic field generated by the stator in order to be contemporaneously moved towards the conveyor in order to translate the first support member and the second support member transversally to the conveyor so that the pusher element abuts the product, or the group of products, arranged on the conveyor and pushes and transfers the product, or the group of products, along a transfer direction (Z) that is transversal to the conveyor, with the counter-pusher element remaining arranged above and facing the product, or the group of products, at least during a first part of transfer of the product, or of the group of products.

2. The pushing apparatus as claimed in claim 1, wherein the pushing apparatus is configured in such a way that, after a first part of the transfer of the product, or of the group of products, the stator is activatable to generate a variable magnetic field along the straight guide so that: while the first carriage continues to be moved towards the conveyor in order to continue to push and transfer the product, or the group of products, along a transfer direction (Z) that is transversal to the conveyor towards a final transfer position (PF), the second carriage and the third carriage can be moved contemporaneously away from the conveyor in order to retract the counter-pusher element with respect to the product, or the group of products.

3. The pushing apparatus as claimed in claim 2, wherein the pushing apparatus is configured in such a way that, after a first part of the transfer of the product, or of the group of products, the stator is activatable to generate a variable magnetic field along the straight guide so that: while the first carriage continues to be moved towards the conveyor in order to continue to push and transfer the product, or the group of products, transversally beyond the conveyor to insert the product, or the group of products, into a container arranged by a side of the conveyor, the second carriage and the third carriage can at the same time be moved away from the conveyor in order to retract the counter-pusher element with respect to the product, or the group of products, and thus enable the pusher element to push and transfer the product, or the group of products, completely inside the container.

4. The pushing apparatus as claimed in claim 1, wherein the articulate system is further configured so that, when the second carriage and the third carriage are reciprocally moved in order to be distanced from one another, the articulate system moves the second support member, and therefore the counter-pusher element, into a lowered position (PA) towards the conveyor so that the counter-pusher element is arranged above and facing the product (P), or the group of products, arranged on the conveyor and with a respective end arranged in an advanced position beyond a second side of the product, or of the group of products, opposite the side on which the pusher element is to act.

5. The pushing apparatus as claimed claim 1, wherein the stator, starting from a configuration in which the second carriage and the third carriage are placed in a position (P1) neared to one another, can be activated to generate variable magnetic fields such that the second carriage and the third carriage can be reciprocally moved in such a way as to be moved away and distanced from one another at different distances and wherein the articulate system is configured in such a way as, when the second carriage and the third carriage are reciprocally moved so as to be distanced from one another at different distances, to move the second support element, and therefore the counter-pusher element, from the raised position (PS) to respective different distinct lowered positions in order to position the counter-pusher element at different heights with respect to the conveyor, in such a way as to adjust to any size-changes of the product, or of the group of products.

6. The pushing apparatus as claimed in claim 1, wherein the first carriage is arranged in front of the third carriage with respect to the conveyor of the product, or of the group of products, to be pushed and transferred along a transfer direction (Z) that is transversal to the conveyor, and wherein the second carriage is arranged interposed between the first carriage and the third carriage.

7. The pushing apparatus as claimed in claim 1, wherein the articulate system is configured in such a way as to comprise:
- a first arm, mounted on the second carriage in such a way as to be parallel to the straight guide;
- a second arm, mounted on the third carriage in such a way as to be parallel to the straight guide and to the first arm;
- at least a pair of rods hinged, at a respective first end, to the second arm, and at a respective second end thereof, to the second support element in such a way as to be parallel to one another,
- a lever, hinged at a respective first end to the first arm and hinged at a second end to at least a rod of the pair of rods.

8. The pushing apparatus as claimed in claim 1, comprising a fourth carriage slidably mounted on the straight guide and comprising permanent magnets, a hopper conformed in such a way as to comprise a passage tunnel for the passage of a product, or a group of products, to be inserted in a container arranged on a second conveyor by a side of the conveyor of the product, or of the group of products, a third support element mounted on the fourth carriage in such a way as to be parallel to the straight guide, wherein the third support element has a length such that the hopper is positioned between the conveyor of the product, or of the group of products, and the second conveyor, and wherein the stator is activatable to generate a magnetic field variable along the straight guide in order to move the fourth carriage towards, or away from, the conveyor of the product, or of the group of products, in order to move the hopper towards, or away from, the container into which the product, or the group of products, is to be inserted, for facilitating insertion thereof.

* * * * *